UNITED STATES PATENT OFFICE.

WILLIAM T. GAMAGE, OF GLOUCESTER, MASSACHUSETTS, ASSIGNOR TO GORTON-PEW FISHERIES COMPANY, OF GLOUCESTER, MASSACHUSETTS, A CORPORATION OF MASSACHUSETTS.

FOOD PRODUCT AND METHOD OF PREPARING THE SAME.

1,408,803. Specification of Letters Patent. Patented Mar. 7, 1922.

No Drawing. Application filed April 16, 1920. Serial No. 374,327.

*To all whom it may concern:*

Be it known that I, WILLIAM T. GAMAGE, a citizen of the United States, residing at Gloucester, in the county of Essex and State of Massachusetts, have invented a new and useful Improvement in Food Products and Methods of Preparing the Same, of which the following is a specification.

This invention relates to a new food product and a process of preparing the same.

The usual process of preserving fish in sealed containers, such as glass jars, tin cans and the like, consists in packing the fish in the containers, sealing these containers, and then "processing" them. That is, heating the container for a sufficient length of time to thoroughly sterilize its contents and cook the fish to the desired degree. A common practice in the canning industry is to place the cans or other containers in an enclosure into which steam under pressure is admitted, a typical process time being about one and one-quarter hours at a steam pressure of fifteen pounds and a temperature of about 240° F.

In the case of herring, mackerel, whiting, and other comparatively delicate fish, the cooking makes the flesh of the fish very tender with the result that the flesh often softens and falls to pieces when it is subjected to the rough handling that it receives during shipment. Frequently the flesh of the fish becomes so thoroughly broken up that when the can is opened the fish presents a mushy, unpleasant appearance, giving the customer the impression that the fish is spoiled. Furthermore, certain fish, particularly herring, contain certain amino acids which have a tendency to attack the metal of the can and produce a de-tinning action. This action results in blackening the contents of the can and rendering it unsalable.

It is the chief object of the present invention to improve the methods of preserving fish which will prevent the undesirable results above described and will result in preserving both the shape and quality of the fish. The invention also provides a new food product.

I have discovered that both the disintegration of the fish, as above described, and also the de-tinning action can be retarded by packing the fish in a vegetable gelatine. According to the present process the fish is prepared and packed in the tins, jars, or other containers, in the usual manner. The remaining space in the container is then filled with a solution of a vegetable gelatine. The strength of the solution may vary considerably, but usually should be between one-quarter of one per cent and five per cent. I prefer ordinarily to use a solution of approximately two per cent strength. After the containers have been filled in this manner they are processed in accordance with the usual practice. When the containers have cooled the jelly "sets" and the strength of the solution is such that it assumes a firm consistency, affording adequate mechanical support for the fish.

By using a solution of approximately the strength indicated, any liability of the jelly to soften is avoided since the jelly retains its firmness even when raised to a temperature above 100° F. The temperature at which the jelly softens can be raised by increasing the strength of the solution, but a solution of the strength above mentioned gives results that are satisfactory for ordinary conditions, and forms a jelly that retains its firmness even under the summer temperature prevailing in southern climates. By affording firm mechanical support for the fish any possibility of its disintegration or breaking up is prevented, and when the container is opened and the fish is removed it still retains its original mechanical structure and presents a pleasing and appetizing appearance. Furthermore, since the jelly prevents any circulation of the contents of the can, any de-tinning action which takes place is confined to that part of the contents in immediate contact with the can. Consequently, the material in the body of the can is unattacked and remains in a wholesome condition.

It may here be stated that I have found animal gelatine to be entirely unsuited for my purpose, both for the reason that it hydrolyzes and loses its gelatinizing power at a temperature below that at which the sterilizing process is carried on, and also for the reason that it softens at a temperature so low that it would not support the fish in warm weather or when stored in warm places, such as the hold of a ship.

The gelatine used preferably is derived from sea moss and may consist of Japanese agar-agar or it may be extracted from Irish sea moss or carrageen. I have found that satisfactory results may be obtained by drying the sea moss in the sun or a hot air dryer, then grinding up the dried sea-weed and mixing it with about fifty times its own weight in water. This mixture is kept at the boiling point, or higher, for several hours after which the liquid is pressed through a filter or screen which takes out the greater part of the vegetable fibre. This liquid may then be filtered to effect a further clarifying. This process yields a clear solution of about one per cent strength, and if it is to be used immediately it may be concentrated to the desired strength, or if it is to be kept for any length of time the water may be evaporated and the gelatine reduced to a dry form. The sea moss gelatines obtainable in the market are suited to the uses of this invention.

I have found sea moss gelatine particularly suited to my present purposes for the reason that in solutions of the strengths above indicated it is a liquid at the processing temperatures and therefore does not interfere in any way with the usual processing practices. Furthermore, it does not undergo any undersirable change while being processed. In other words, it requires no change in the present methods of processing but still gives the fish the mechanical support after the processing operation has been completed which is desired.

What is claimed as new is:

1. A product of the character described comprising cooked fish, a supporting jelly-like medium in which said fish is embedded, said medium containing from one-quarter of one per cent to five per cent of sea moss gelatine, and a sealed container enclosing said fish and jelly and substantially filled thereby.

2. A product of the character described, comprising cooked fish supported by a jelly-like medium derived from sea moss, in which said fish is embedded, and a sealed metal container enclosing said fish and jelly and substantially filled thereby, said jelly being formed from a dilute liquid, but having a softening point above 100° F.

3. That improvement in the process of preserving fish, which consists in packing the fish in a metal container, substantially filling the remaining space in the container with a dilute solution of a gelatin formed from sea moss, said solution being liquid at high temperature but assuming a firm jelly-like consistency sufficient to support the fish when cooled to a point somewhat above 100° F., then sealing the container and sterilizing and cooking its contents at a temperature above 230° F.

4. That improvement in the process of preserving fish which consists in packing the fish in a container, substantially filling the remaining space in the container with a solution of a sea moss jelly of from one-quarter of one per cent to five per cent in strength, and then sealing and processing the container.

In testimony whereof I have signed my name to this specification.

WILLIAM T. GAMAGE.